United States Patent [19]

Chang

[11] Patent Number: 4,722,506

[45] Date of Patent: Feb. 2, 1988

[54] PRINTER STAND

[76] Inventor: Robert H. Chang, 870 North Ave., Des Plaines, Ill. 60016

[21] Appl. No.: 943,957

[22] Filed: Dec. 22, 1986

[51] Int. Cl.⁴ ................................ F16M 1/00

[52] U.S. Cl. ................................ 248/676; 248/176; 400/613.2; D 18/23

[58] Field of Search ............... 248/637, 676, 670, 127, 248/176, 163.1, 172, 174, 1 B, 441.1; 312/183; 211/50, 13, 42; D 6/419, 420; D 18/23; 400/691, 613.2, 613.3

[56] References Cited

U.S. PATENT DOCUMENTS

| | | | |
|---|---|---|---|
| 2,845,019 | 7/1958 | Stiefel | 400/613.2 X |
| 4,482,066 | 11/1984 | Dykstra | 312/330 R X |
| 4,544,065 | 10/1985 | Mueller | 211/13 |
| 4,570,802 | 2/1986 | Murphy | 211/13 |

FOREIGN PATENT DOCUMENTS

| | | | |
|---|---|---|---|
| 647729 | 8/1962 | Canada | 400/613.2 |
| 57-11072 | 1/1982 | Japan | 400/613.2 |

OTHER PUBLICATIONS

"Micro-Fold", The Drawing Board Computer Supplies Catalog, 1985 Fall Catalog, p. 59.

IBM Technical Disclosure Bulletin, vol. 23, No. 3, 8-1980.

IBM Technical Disclosure Bulletin, vol. 22, No. 10, 3-1980.

*Primary Examiner*—J. Franklin Foss

*Assistant Examiner*—David L. Talbott

*Attorney, Agent, or Firm*—Milton S. Gerstein; Marvin N. Benn

[57] ABSTRACT

A printer stand is provided with a rear, chute-like paper guide. A pair of slidable trays are provided, with the upper tray serving as a store for blank input paper for a printer supported on the stand, while the lower tray serves as a store for the printed, output paper from the printer. The paper guide has a first, rear, inclined guide wall with a lower edge surface that is spaced rearwardly of the rearmost portion of the upper tray for proper clearance for the output paper on its passage to the lower tray. The paper guide also has a second guide wall spaced forwardly of the first wall, which together with the first wall forms the chute-like passageway for the output paper. The first and second guide walls are connected to the rear of the printer-stand supporting surface, and there are provided upper guide surfaces for directing the output paper toward the chute and away from the path of input paper.

7 Claims, 9 Drawing Figures

PRINTER STAND

BACKGROUND OF THE INVENTION

The present invention is directed to a stand for supporting a printer, and for supporting paper fed into and fed out from the printer, so as to neatly stack and conveniently accomodate the paper-feeding process. The type of printer directly suitable for support on the present stand is that most commonly referred to as a high-speed printer, used in conjunction with personal and micro-computers. An example of such a prior art printer stand is that disclosed in U.S. Pat. No. 4,570,802, which discloses a stand having an inclined upper surface for supporting the printer and a lower inclined shelf for supporting the paper to be fed into the printer, with the stand being self-supporting on another surface which serves as the depositary for the paper being fed out of the printer. Other such prior art printer stands exist, but all suffer from the disadvantage of frequent snagging leading to downtime, and from the disadvantage of not allowing easy access to the store of paper. These prior art stands do not allow for accessing of the paper other than from the rear. Access to the paper being fed into the printer is usually difficult and awkward, especially when repeated access is necessary as when, for example, the paper becomes jammed or snagged.

SUMMARY OF THE INVENTION

It is, therefore, the primary objective of the present invention to provide a stand for a printer, which accomodates both rear-fed and bottom-fed printers, allowing for the printer paper to be fed into and out from the printer, without any obstructions presented by the stand.

It is another objective of the present invention to provide a printer stand that has a pair of removable or slidable paper supporting surfaces, one for the paper being fed into the printer and one for the paper fed from the printer, with the pair of slidable surfaces being mounted one above the other, with the upper surface serving as a tray for storing the paper fed into the printer. The slidable and removable trays allow for access to the paper, both fed into and out of the printer, via the front of the printer stand.

It is another objective of the present invention to provide a guide arrangement that allows for the feeding in of the blank input paper to the rear of a rear-fed printer, while allowing for the guiding of the output paper being fed from the printer to the lower tray, with the output paper's path being considerably free and removed from the path of the paper being fed into the printer, in order to prevent any contact between the two, to thereby obviate potential snags. The guide arrangement includes a rear, rearwardly-inclining guide plate for directing the paper being fed from the printer to the lower tray.

Toward these and other ends, the printer stand of the present invention is provided with a pair of side walls, and an inclined top wall portion interconnecting upper surface portions of the two side walls. The inclined top wall portion is a supporting surface for a printer, with the two side walls and top wall portion defining a hollow interior, within which is provided a pair of movable and slidable shelves, the upper shelf being used for the storage of blank paper to be fed into the printer, while the lower shelf is used for storing the printed paper being fed out from the printer. Each of the shelves is removable from the printer stand, to allow easy access to each of the stores of paper. There is also provided a guiding arrangement on the upper, rear portion of the stand, which guiding arrangement includes a forwardly facing surface for directing the paper from the printer to the rest of guiding arrangement, such that the printed output paper is spaced from the path of the blank input paper being fed into the printer for all movements thereof. The guiding arrangement also includes a chute-like element having a first, rearwardly-declining guide surface connected to the top of a vertical guide surface, and a second, rearwardly-inclining guide surface, the second inclining surface extending below the lowermost portion of the vertical surface, such that a space is provided between which passes the paper being fed out from the printer. The second, inclining surface is situated at an angle such that the paper exiting from the chute-like member is directed directly toward the rear-ward-most portion of the lower slidable shelf upon which the output paper being fed out from the printer is stored. The chute-like element is also provided with an elongated slot in the upper, front surface thereof, which allows for the passage therethrough of the input paper on the front side of the first declining surface, which surface thereby separates the paper being fed into the printer from that being fed out from the printer. The upper printer-supporting surface of the printer stand is also provided with a centrally located, rectilinear-shaped opening, through which may be fed the input paper from the upper sliding shelf upon which is supported the input paper. This rectilinear-shaped opening is used for that type of printer stand where the paper is fed from the bottom, while for rear-fed printers, the input paper is fed through the slot in the front portion of the chute-like member. The two slidable shelves are spaced vertically apart sufficiently enough to make sure that the exit from the chute-like member of the output paper being fed out from the printer has sufficient clearance relative to the upper sliding shelf to enter into the rear portion of the lower shelf. The second, inclined guide surface of the chute-like element has an angle of incline chosen such that the paper fed out from the printer travels along a path least likely to experience any snags or obstructions, as well as to ensure that the paper fed from the printer is correctly stored in the lower slidable shelf.

BRIEF DESCRIPTION OF THE DRAWING

The invention will be more readily understood with reference to the accompanying drawings, wherein.

DETAILED DESCRIPTION OF THE INVENTION

Figure 1:
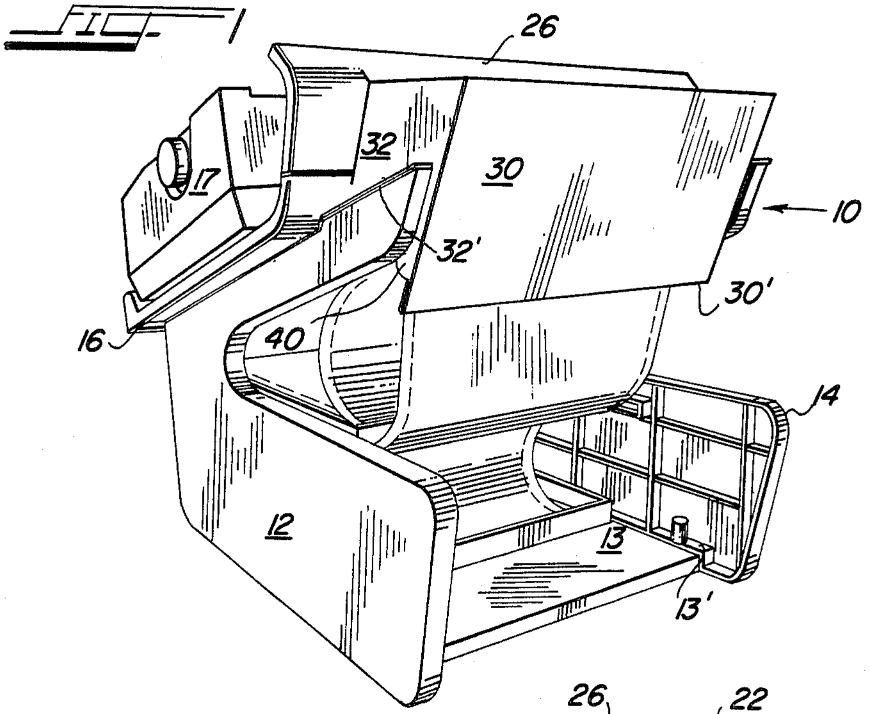
FIG. 1 is a perspective view of the printer stand of the present invention.

Referring now to the drawings in greater detail, the printer stand of the present invention is indicated generally by reference numeral 10. The stand includes a pair of side walls 12 and 14, a bottom wall 13, each side wall having a central cut out which allows access to the interior of the stand. The upper edge surfaces of the side walls 12 and 14 slope upwardly and rearwardly, and support thereon an upper, printer-stand supporting surface 16, which has a forwardmost, upwardly-extending lip 16′ for retaining a conventional printer 17 thereon, in the manner clearly shown in FIGS. 1 and 2. The upper supporting surface 16 has a lateral width generally greater than the distance between the outer surfaces of the side walls 12 and 14. The printer stand 17 is placed on the upper supporting surface 16 such that its platen is toward the rear. The upper supporting surface 16 is also provided with a rearward-most, upwardly-extending, inclined rear wall 20, to which is connected a paper input and output guiding arrangement, indicated generally by reference numeral 22. The paper guiding arrangement 22 includes a forward bent-shaped guide surface having a lower portion 24 and an upper, declining portion 26 extending forwardly and upwardly with respect to the surface 24, as clearly shown in FIG. 2. The bottom edge surface of the portion 24 is fixedly connected and integral with the upper edge surface of the rear wall 20 of the printer stand supporting surface 16 for partially supporting the paper guiding arrangement thereon. The lower guide portion 24 is provided with a laterally-extending opening or slot through which may pass input paper to be fed to the platen of the printer 17, when such printer 17 is of the rear-fed type, in the manner shown in FIG. 7. The upper guide portion 26 is used to deflect the printer paper fed out of the printer, to keep it spaced from the input paper entering the printer, to thereby prevent any entanglement or obstruction thereof.

The paper guiding arrangement 22 also includes a chute-like arrangement having a rearwardly inclining rear guide wall 30, a pair of side wall surfaces 32 and 34, and a bipartite front wall comprised of a vertically-extending portion 36 and a rearwardly-declining upper guide wall portion 38. The wall portion 38 is connected at its rearward-most end to the upper edge surface of the vertical wall portion 36, while the forward-most portion of the wall portion 38 is connected to the wall portion 26 proximate the curved juncture thereof, in the manner shown in FIG. 7. The bottom edge surfaces of the side walls 32 and 34 of the guiding arrangement 22 are fixedly connected to the upper rear edge-surface portions of the stand's side walls 12 and 14, as indicated by reference numeral 32′ in FIG. 1. The rear guide wall 30 of the paper guiding arrangement 22 has a length taken from top to bottom such that its lowermost edge-surface portion 30′ extends below the lowermost portion 36′ of the vertical wall portion 36, in a manner shown in FIG. 7, which defines the exit passageway for the output paper. The edge-surface 30′ extends rearwardly enough so as to direct the paper to an appropriate tray, to be described below in greater detail.

The lowermost surface 36′ preferably extends downwardly enough so as to define a relatively narrow opening to ensure that the paper issuing from the printer is guided correctly and without mishap to a lower, paper-storage tray. The vertical wall portion 36 of the paper guiding arrangement 22 also serves as a divider between the paper entering the printer and the paper exiting the printer.

Figure 2:
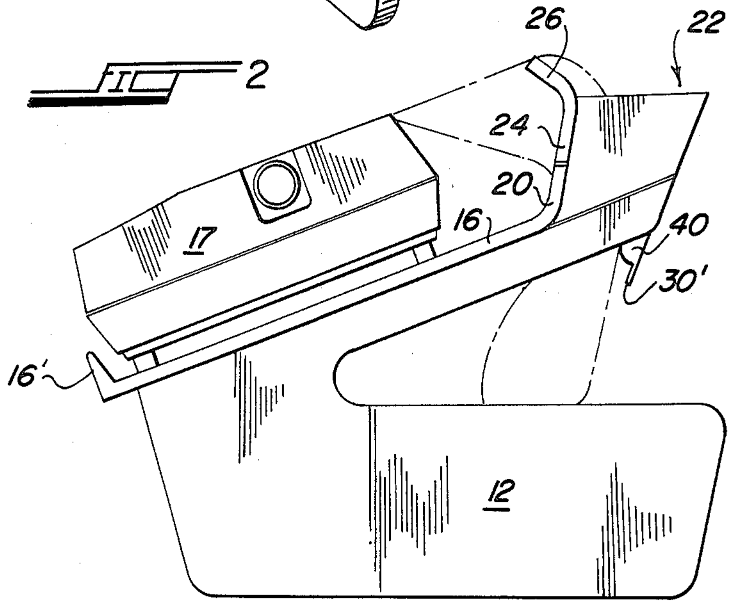
FIG. 2 is a side elevational view of the printer stand of FIG. 1.
Figure 3:
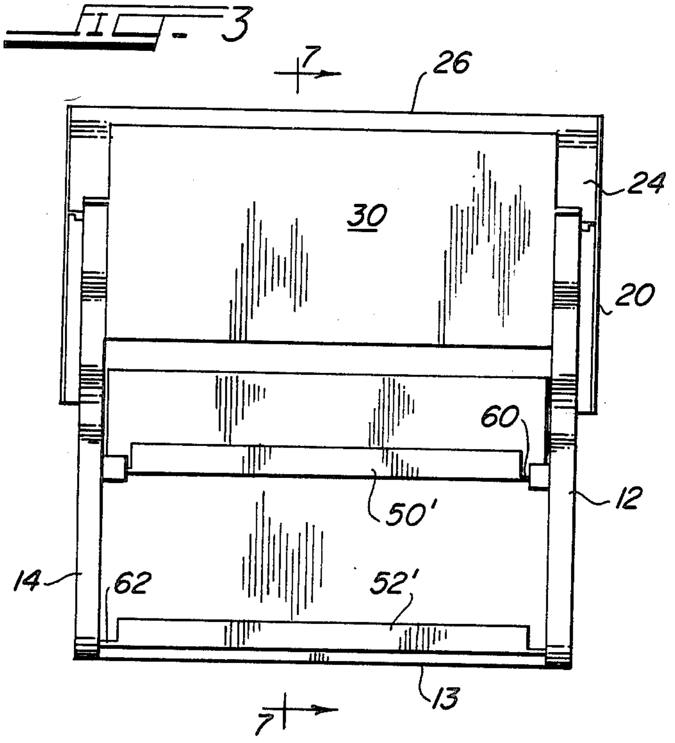
FIG. 3 is a rear view of the printer stand of FIG. 1.
Figure 4:
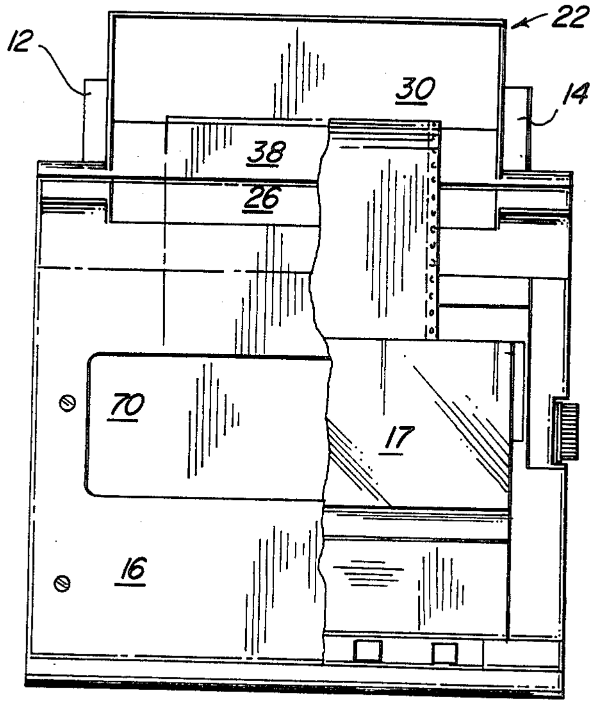
FIG. 4 is a top view of the prnter stand of FIG. 1.
Figure 5:
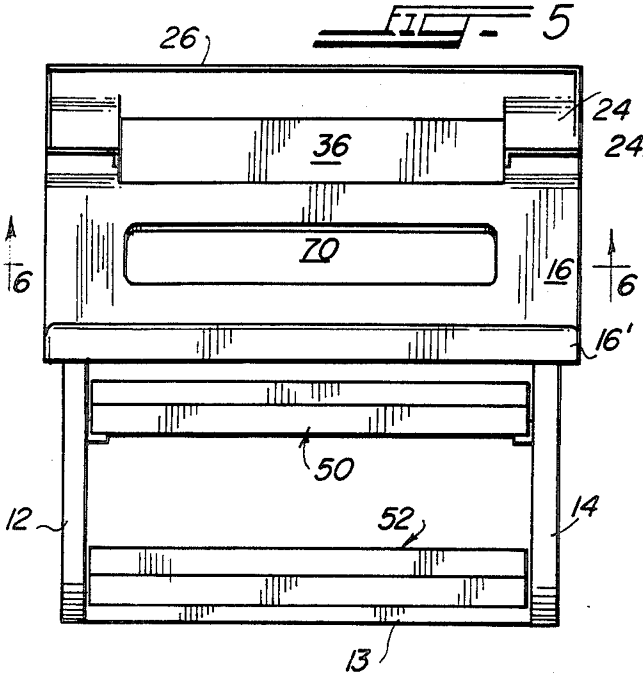
FIG. 5 is a front view of the printer stand of FIG. 1.

The side wall surfaces 32 and 34 also include a lower connecting portion 40, shown in FIGS. 1 and 2, which extend downwardly for connection with the lower portions of the rear wall 30, in order to prevent lateral movement of the paper emerging from the printer.

Figure 7:
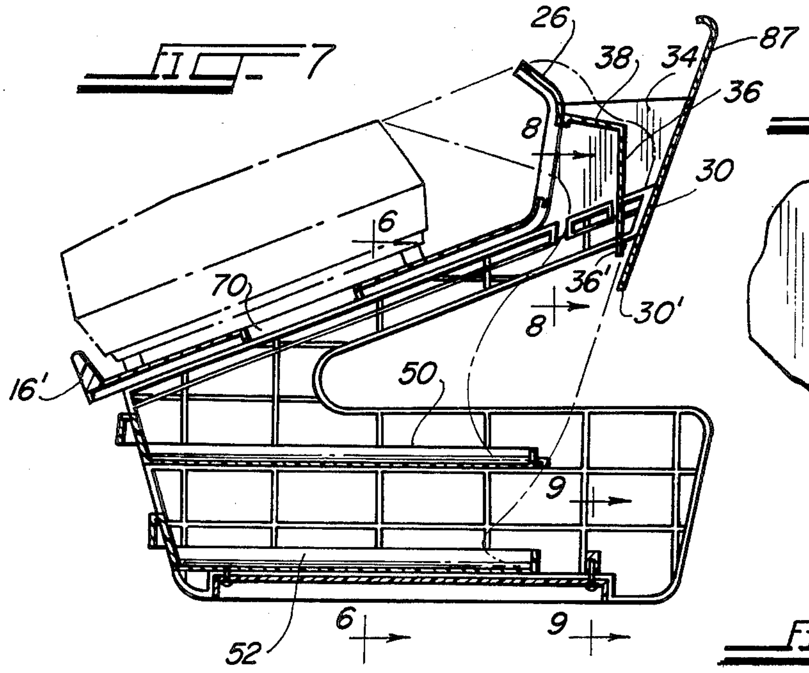
FIG. 7 is a side elevational view, in partial cross section, with part of the structure broken away to show the details of the interior of the printer stand of FIG. 1.
Figure 8:
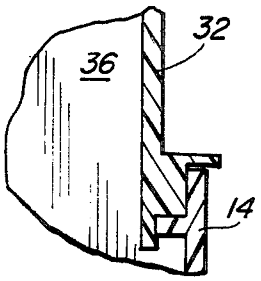
FIG. 8 is a cross-sectional view taken along lines 8—8 of FIG. 7.
Figure 9:
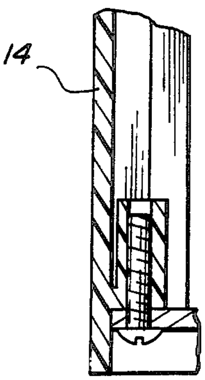
FIG. 9 is a cross-sectional view taken along lines 9—9 of FIG. 7.

In the preferred embodiment, the paper guiding arrangement 22, including the wall portions 24, 26, 30, 32 and 34, are formed integrally and molded from one piece of hard plastic. The paper guiding arrangement 22, therefore, serves as a guide for the paper emerging from the printer, and ensures that the output paper does not interfere or cross the path of the input paper entering the printer. The paper guiding arrangement 22 also serves as a guide for the input paper entering the printer for rear-fed printer stands, as shown in FIG. 7.

Figure 6:
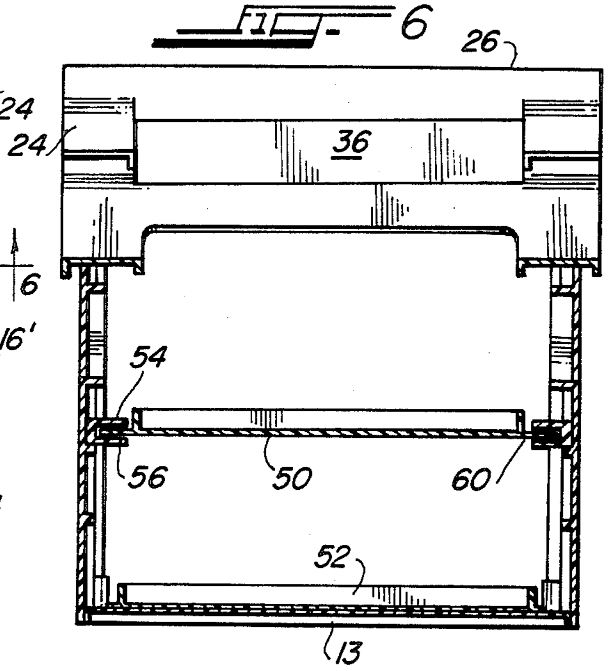
FIG. 6 is a cross-sectional view taken along lines 6—6 of FIG. 7.

Included in the interior of the printer 10 is a pair of removable and slidable trays or shelves 50 and 52, with the upper tray 50 serving as the storage tray for the paper entering the printer, and the lower tray 52 serving as the storage tray for the paper exiting the printer. Each of the shelves or trays 50 and 52 is slidably mounted in appropriately-formed grooves in the interior surfaces of the side walls 12 and 14 of the printer stand 10. These grooves are formed by any appropriate means, such as by cooperating rails 54 and 56, as shown in FIG. 6 for the upper tray 50, while for the lower tray 52, such grooves may be formed between the upper surface of the bottom wall 13 and a cooperating rail 13′ (FIG. 1). Appropriately-placed lateral tongues 60 and 62 for the trays 50 and 52, respectively, slide in these grooves. The trays 50 and 52 pull out from the front to allow access to these trays for the placement of blank paper on the tray 50, for the removal of the printed paper on the tray 52, or for access to either of these trays in order to correct misfeeding or improper layering of the paper. Each of the trays 50 and 52 extends rearwardly approximately to the same depth along the side walls 12 and 14. According to the invention, the lowermost edge surface 30′ of the rear wall 30 of the guiding arrangement is contained in a vertical plane that is positioned substantially rearwardly of the rearward-most portion of the trays 50 and 52, in the manner shown in FIG. 7, so that the printed paper exiting from the printer and guided through the chute-like arrangement of the paper guide 22 may travel forwardly to the rearward-most portion of the lower storage tray 52. The angle of slope of the rear wall 30 is preferably such that, when extended, the plane thereof will intersect the vertical plane containing therein the rearward-most portion of the storage tray 52. Also, preferably, the vertical wall portion 36 of the guiding arrangement is also contained in a vertical plane that is spaced rearwardly of the vertical plane containing therein the rearward-most wall portions of the trays 50 and 52. Such a construction will ensure that the output paper is deposited correctly and unhindered onto the rear portion of the storage tray 52, while allowing for the safe and unhindered path of travel of the paper fed into the printer for the rear-fed type of printer 17. Because the lower tray 52 is a storage tray for the paper emerging from the printer, it is possible to remove the upper tray 50 even while the paper is being fed into the printer 17, without interrupting or adversely effecting the paper being fed out of the printer. Also, it is possible to remove the lower tray 52 for accessing the output paper even during feeding of the input paper into the printer 17, since the lowermost surfaces 30′ and 36′ will guide the paper exiting from the printer rearwardly of the rear surface of the upper tray 50, to thereby prevent any interference between the papers entering and exiting the printer. Even with the removal of the lower tray 52 during the normal operation of paper feed-in, the rear surface of the tray 50 will prevent the intersection of the path of paper emerging from the printer with the path of paper being fed into the printer, so that continuous operation of the printer 17 is possible, regardless of whether the tray 50 or 52 is removed. Further, the use of these removable, or slidable, trays 50 and 52 allows access to the paper from the front of the printer stand, as opposed to the rear which is prevalent in prior art stands.

For the use of a printer that is of the bottom-fed type, the upper printer-supporting surface 16 is provided with a laterally-extending opening or slot 70 through which the paper may pass directly to the printer's platen. The rear wall 30 is also provided with an upper, forwardly-curved and upwardly-extending portion 87 for deflecting the paper exiting from the printer downwardly into the chute-like arrangement.

It is noted that each of the trays 50 and 52 is provided with a forward, upwardly-extending handle and lip portion 50′ and 52′, respectively, which limits the rearward-most sliding of the trays, and also provides for a convenient handle by means of which the tray may be gripped and pulled outwardly for the loading and unloading of paper. Also, each of the side walls 12 and 14 is provided with square-shaped latticework for reinforcement and structural integrity, as shown in FIG. 7.

While a specific embodiment of the invention has been shown and described, it is to be understood that numerous changes and modifications may be made therein, without departing from the scope and spirit of the invention, as set forth in the appended claims. For example, the upper tray 50 may be modified to extend less toward the rear than the lower tray 52, thereby allowing for a change in slope of the rear surface wall 30 and its orientation closer to the rearward-most portion of the tray 52, as long as the angle of wall 30 allows for the proper folding of the paper emerging from the printer.

What is claimed is:

1. In a printer stand for supporting a printer thereon, said printer stand comprising a pair of side walls, an upper, printer stand supporting surface interconnecting portions of said side walls, said pair of side walls and said upper supporting surface defining a hollow interior; a first, upper paper supporting tray, and a second, lower paper supporting tray, and means for guiding paper between said first and second trays and said upper supporting surface, wherein the improvement comprises:

- said means for guiding paper comprising a first, rearwardly inclining guide wall surface positioned rearwardly of said upper supporting surface and comprising a lowermost edge surface;
- said first and second upper trays having a rearmost surface portion contained in a vertical plane spaced forwardly of a vertical plane containing therein said lowermost edge surface;
- said means for guiding paper further comprising a second guide wall surface positioned forwardly of said first guide wall surface, said second guide wall surface having a lowermost edge surface spaced vertically higher than said lowermost edge surface of said first guide wall surface; an upwardly-extending third guide wall surface, and a fourth guide wall surface having a first upper end portion connected to a lower portion of said third guide wall surface and a second lower end portion connected to an upper portion of said second guide wall surface;
- said guide means further comprising a pair of side wall surfaces extending between the side edges of said first and second guide wall surfaces to form thereby a chute-like member, said means for guiding being fixedly connected to upper portions of said first and second walls of said printer stand;
- each of said first and second trays being slidably mounted between said first and second side walls, said printer stand further comprising means for mounting said first and second trays for slidable movement relative to said side walls;
- said upper supporting surface comprising a laterally-extending opening through which may pass blank paper from said first, upper tray to a printer supported on said upper supporting surface;
- said upper supporting surface being rearwardly and upwardly inclined, and comprising an upwardly-extending forward lip against which may abut a portion of a printer stand supported on said upper supporting surface;
- said means for guiding further comprising a fifth wall surface having a lower edge surface connected to a rear surface portion of said upper supporting surface, said fifth wall surface having a laterally-extending slot formed therein through which may pass blank paper to a printer supported on said upper supporting surface, said fifth wall surface having an upper edge surface connected to a lower edge surface of said third guide wall surface.

2. The improvement according to claim 1, wherein said lowermost edge surface of said first guide wall surface and said lowermost edge surface of said second guide wall surface are substantially positioned within the same vertical plane.

3. The improvement according to claim 1 further comprising a store of blank paper for supply to a printer supported on said upper supporting surface, said store of blank paper being supported on said first, upper tray;

- and a store of output paper from a printer supported on said upper supporting surface, said output paper being supported in said second, lower tray.

4. The improvement according to claim 1, wherein said means for mounting said first and second trays for slidable movement relative to said side walls comprises first means for limiting the sliding movement of said first tray into the interior of said printer stand, and a second means for limiting the sliding movement of said second tray rearwardly into the interior of said printer stand.

5. The improvement according to claim 1, wherein said fourth guide wall surface is a substantially flat rearwardly declining surface against which may abut portions of the paper moving in said means for guiding paper.

6. The improvement according to claim 1, wherein said third upwardly-extending guide wall surface is a substantially bent-shaped surface, bending away from said first guide surface.

7. In a printer stand for supporting a printer thereon, said printer stand comprising a pair of side walls, an upper, printer stand supporting surface interconnecting portions of said side walls, said pair of side walls and said upper supporting surface defining a hollow interior; a first upper, paper supporting tray, and a second, lower paper supporting tray, and means for guiding paper between said first and second trays and said upper supporting surface, wherein the improvement comprises:

first means for slidably mounting said first upper tray for sliding movement between said pair of side walls;

second means for slidably mounting said second lower tray for sliding movement between lower portions of said pair of side walls;

first means for limiting the sliding movement of said first tray rearwardly into the interior of said printer stand;

second means for limiting the sliding movement of said second tray rearwardly into the interior of said printer stand;

said guide means comprising a first, rear guide wall having a lower edge surface spaced rearwardly from the rearmost surface of each of said first and second trays, said rearward direction being taken in direction of movement of said first, upper tray into the interior of said printer stand, said rear guide wall sloping rearwardly and upwardly; a second guide wall spaced forwardly of said first, rear guide wall, said first and second guide walls defining therebetween a space through which paper emerges and travels in a downward direction to said second tray;

a third guide wall having a lower portion connected to a portion of said upper supporting surface, said third guide wall having a slot provided therein through which may pass input paper from said first upper tray, said second wall having an upper end portion connected to a portion of said third guide wall, said third guide wall having an upwardly protruding section projecting upwardly beyond the upper end portion of said second guide wall connected to said third guide wall, said upwardly protruding section acting as a spacing guide means for the output paper; said second guide wall comprising a first lower section thereof extending substantially in a vertical plane, and a second upper section extending substantially at an angle with respect to said first vertical section, said second upper section defining a surface against which a portion of the output paper may touch against during its path along said means for guiding paper in order to help prevent snags during travel of the output paper through said means for guiding paper.

* * * * *